(12) United States Patent
Brand et al.

(10) Patent No.: US 8,762,408 B2
(45) Date of Patent: Jun. 24, 2014

(54) OPTIMIZING SOFTWARE APPLICATIONS

(75) Inventors: Hartwig Brand, Walldorf (DE); Dirk Debertin, Walldorf (DE); Carsten Dietze-Selent, Walldorf (DE); Peter Goebbels, Walldorf (DE); Cornelia Haase, Walldorf (DE); Christian Hansen, Walldorf (DE); Kerstin Hoeft, Walldorf (DE); Uwe Hommel, Walldorf (DE); Ulrich Koch, Walldorf (DE); Harald Kuck, Walldorf (DE); Jens Otto, Walldorf (DE); Thomas Raupp, Walldorf (DE); Tobias Wenner, Walldorf (DE); Michael Schafft, Bohl-Iggelheim (DE); Matthias Schwarz, Walldorf (DE); Jemin Tanna, Bangalore (IN)

(73) Assignee: SAP AG, Walldorf (DE)

( * ) Notice: Subject to any disclaimer, the term of this patent is extended or adjusted under 35 U.S.C. 154(b) by 74 days.

(21) Appl. No.: 13/450,774

(22) Filed: Apr. 19, 2012

(65) Prior Publication Data

US 2013/0238657 A1  Sep. 12, 2013

(30) Foreign Application Priority Data

Mar. 7, 2012  (IN) .............................. 867/CHE/2012

(51) Int. Cl.
*G06F 17/30*  (2006.01)
(52) U.S. Cl.
USPC ........................................................ 707/770
(58) Field of Classification Search
USPC ................................................ 707/769, 770
See application file for complete search history.

(56) References Cited

U.S. PATENT DOCUMENTS

| | | | |
|---|---|---|---|
| 6,253,199 B1 * | 6/2001 | Wakio et al. ........... | 707/999.003 |
| 6,519,601 B1 * | 2/2003 | Bosch .................... | 707/999.003 |
| 7,191,160 B2 | 3/2007 | Hoeft et al. | |
| 7,325,233 B2 | 1/2008 | Kuck et al. | |
| 7,392,236 B2 | 6/2008 | Rusch et al. | |
| 7,421,437 B2 | 9/2008 | Hoeft et al. | |
| 7,457,828 B2 | 11/2008 | Wenner et al. | |
| 7,480,681 B2 | 1/2009 | Fecht et al. | |
| 7,490,102 B2 | 2/2009 | Ivanova et al. | |
| 7,571,164 B2 | 8/2009 | Kuersch et al. | |
| 7,587,705 B2 | 9/2009 | Benjes et al. | |
| 7,631,303 B2 | 12/2009 | Debertin et al. | |
| 7,634,771 B2 | 12/2009 | Benjes et al. | |
| 7,669,181 B2 | 2/2010 | Benjes et al. | |
| 7,774,319 B2 | 8/2010 | Schweigkoffer et al. | |
| 2004/0017395 A1 * | 1/2004 | Cook ........................... | 345/745 |
| 2006/0248507 A1 | 11/2006 | Benjes et al. | |
| 2006/0248545 A1 | 11/2006 | Benjes et al. | |
| 2007/0190979 A1 * | 8/2007 | Hatano ....................... | 455/414.1 |
| 2008/0154907 A1 * | 6/2008 | Prasad et al. ................... | 707/10 |
| 2010/0070336 A1 | 3/2010 | Koegler et al. | |
| 2010/0123917 A1 * | 5/2010 | Minagawa ...................... | 358/1.9 |
| 2010/0145975 A1 * | 6/2010 | Ratiner et al. ................. | 707/765 |
| 2011/0125778 A1 * | 5/2011 | Kubo ............................ | 707/769 |

* cited by examiner

*Primary Examiner* — Rehana Perveen
*Assistant Examiner* — Tiffany Thuy Bui
(74) *Attorney, Agent, or Firm* — Fish & Richardson P.C.

(57) ABSTRACT

Techniques for optimizing a software application include receiving, at a local computing system, a query from an application for data stored on a database table, the query including a context defined by a name of the database table; comparing the context of the query to a context of a predefined query scenario; based on the context of the query matching the context of the predefined query scenario, retrieving data stored on a secondary database replicated from data stored on a main database; and passing the retrieved data from the secondary database to the application.

22 Claims, 4 Drawing Sheets

| Field name | Key | Data element | Data type | Length | Description |
|---|---|---|---|---|---|
| SCENARIO | X | RDA_SCENARIO | CHAR | 20 | Scenario (e.g. NOTE_<number> or Z*) |
| TABNAME | X | TABNAME | CHAR | 30 | Table or view name |
| MAINPROG | X | PROGNAME | CHAR | 40 | Calling program |
| JOBNAME | X | BTCJOB | CHAR | 32 | Background job name |

| Field name | Key | Data element | Data type | Length | Description |
|---|---|---|---|---|---|
| SCENARIO | X | RDA_SCENARIO | CHAR | 20 | Scenario (e.g. NOTE_<number> or Z*) |
| VERSION | | RDA_VERSION | NUMC | 10 | Scenario version |
| STATUS | | RDA_STATUS | CHAR | 1 | Status of the scenario- 'A' = on; 'I' = off |
| DBCONNECTION | | DBCON_NAME | CHAR | 30 | Logical name for the secondary database connection |
| CHANGED_BY | | SYUNAME | CHAR | 12 | User of last change |
| CHANGED_ON | | SYDATUM | DATS | 8 | Date of last change |
| CHANGED_AT | | SYUZEIT | TIMS | 6 | Time of last change |
| DESCRIPTION | | CHAR200 | CHAR | 200 | Scenario description |

| Field name | Data element | Data type | Length | Description |
|---|---|---|---|---|
| TABNAME | TABNAME | CHAR | 30 | Table Name |
| MAINPROG | PROGNAME | CHAR | 40 | Calling program |
| JOBNAME | BTCJOB | CHAR | 32 | Background job name |
| DBCONNECTION | DBCON_NAME | CHAR | 30 | Logical name for a database connection |
| SCENARIO | RDA_SCENARIO | CHAR | 20 | Scenario |

FIG. 4

| TABNAME | MAINPROG | JOBNAME | DBCONNECTION | SCENARIO |
|---|---|---|---|---|
| VERRDABAT | VER28454 | VER28454_B... | YI3_FOR_RDA | Z_RDA_VERIFICATION |
| VERRDACMU | VER28454 | | YI3_FOR_RDA | Z_RDA_VERIFICATION |
| VERRDACNU | VER28454 | | YI3_FOR_RDA | Z_RDA_VERIFICATION |
| VERRDANOPROG | | | YI3_FOR_RDA | Z_RDA_VERIFICATION |
| VERRDATMB | VER28454 | | YI3_FOR_RDA | Z_RDA_VERIFICATION |
| VERRDATMU | VER28454 | | YI3_FOR_RDA | Z_RDA_VERIFICATION |
| VERRDATNB | VER28454 | | YI3_FOR_RDA | Z_RDA_VERIFICATION |
| VERRDATNU | VER28454 | | YI3_FOR_RDA | Z_RDA_VERIFICATION |
| VERRDAVW1 | VER28454 | | YI3_FOR_RDA | Z_RDA_VERIFICATION |

Data Browser: Table RDA_CONFIG Select Entries

OPTIMIZING SOFTWARE APPLICATIONS

CLAIM OF PRIORITY

This application claims priority under 35 U.S.C. §119 to Indian Patent Application No. 867/CHE/2012, filed Mar. 7, 2012, which is incorporated by reference as if fully set forth herein.

TECHNICAL BACKGROUND

This disclosure relates to optimizing software applications and, more particularly, optimizing software applications that utilize data stored in a database.

BACKGROUND

Software applications, such as enterprise applications that execute in a business enterprise environment, often rely on data stored in a database, such as business data stored in one or more (and even thousands) of database tables. Often, queries on the data may be run by the application, such as by an application business user interested in viewing financial, manufacturing, or other types of data stored in the database tables. Due to the nature of the database (e.g., a relational database stored on hard disk), generally, as well as the possible vast amounts of data stored in the database tables, the user may often experience a lag time between initiation of the query or other action and receipt of the requested business information.

SUMMARY

In a general embodiment, techniques for optimizing a software application include receiving, at a local computing system, a query from an application for data stored on a database table, the query including a context defined by a name of the database table; comparing the context of the query to a context of a predefined query scenario; based on the context of the query matching the context of the predefined query scenario, retrieving data stored on a secondary database replicated from data stored on a main database; and passing the retrieved data from the secondary database to the application.

A first aspect combinable with any of the general embodiments further includes receiving, at the local computing system, the predefined query scenario from a remote computing system.

In a second aspect combinable with any of the previous aspects, the predefined query scenario includes a scenario table name.

In a third aspect combinable with any of the previous aspects, comparing the context of the query to a context of a predefined query scenario further includes comparing the name of the database table to the scenario table name.

In a fourth aspect combinable with any of the previous aspects, the predefined query scenario further includes a scenario application name.

In a fifth aspect combinable with any of the previous aspects, comparing the context of the query to a context of a predefined query scenario further includes comparing a name of the application to the scenario application name.

In a sixth aspect combinable with any of the previous aspects, the predefined query scenario further includes a scenario job name.

In a seventh aspect combinable with any of the previous aspects, comparing the context of the query to a context of a predefined query scenario further includes comparing a name of a background job to the scenario job name.

In an eighth aspect combinable with any of the previous aspects, the secondary database is an in-memory database that includes volatile RAM memory.

In a ninth aspect combinable with any of the previous aspects, the main database is magnetic memory.

A tenth aspect combinable with any of the previous aspects further includes receiving, at the local computing system, a second query from the application for data stored on a database table, the second query comprising a second context defined by a name of the database table.

An eleventh aspect combinable with any of the previous aspects further includes comparing the second context of the query to the context of the predefined query scenario.

An twelfth aspect combinable with any of the previous aspects further includes based on the second context of the second query not matching the context of the predefined query scenario, retrieving the data from the main database.

A thirteenth aspect combinable with any of the previous aspects further includes passing the retrieved data from the main database to the application.

In a fourteenth aspect combinable with any of the previous aspects, the data is retrieved, in response to the second query, from the main database through a primary connection.

In a fifteenth aspect combinable with any of the previous aspects, the data is retrieved, in response to the query, from the secondary database through a secondary connection.

Various embodiments of an application accelerator in accordance with the present disclosure may include one, some, or all of the following features. For example, the application accelerator may run software applications, such as enterprise applications, so that data from performance critical tables in a main database is replicated to and read from a secondary database (e.g., an in-memory database that includes electronic memory). Further, the application accelerator may improve performance (e.g., accelerate retrieval and/or presentation of information from database tables) by buffering (e.g., completely) certain database tables in the in-memory. For example, the application accelerator may improve performance of certain reporting-type applications (as one example), which may work with replicated data (i.e., data that has a slight time delay compared with the original data and that does not have transactional consistence with the original data). As yet another example, the application accelerator may operate parallel to an existing enterprise resource planning (ERP) system in an instrumented application server. The application accelerator on the instrumented application server may execute standard (e.g., previously installed) ERP applications without modifications while improving performance of such applications. In a further example, the application accelerator may still provide for standard (e.g., read/write) operations on a main database (e.g., a relational database stored on magnetic disc) while also providing the capability of reading data from database tables replicated to the in-memory database (rather than the main database) via a secondary database connection.

Various embodiments of an application accelerator in accordance with the present disclosure may also include one, some, or all of the following features. For example, the application accelerator may be activated and selectively retrieve requested data from database tables in either of the main or in-memory database depending on, for instance, the particular database table itself, the particular application (e.g., the particular program), and the particular background job. Thus, the application accelerator may automatically retrieve data from either of the main or in-memory database without further input from a business user. The application accelerator may therefore redirect database queries to the in-memory database by the secondary database connection within a database interface layer of an application server. In some embodiments, the application accelerator may increase performance (e.g., database runtimes in milliseconds) by between a factor of 5 and a factor of 8.

These general and specific aspects can be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DESCRIPTION OF DRAWINGS

FIGS. 3A-3C illustrate example configuration tables used by an example embodiment of an application accelerator according to the present disclosure; and FIG. 4 illustrates another example view of a configuration table used by an example embodiment of an application accelerator according to the present disclosure.

DETAILED DESCRIPTION

Figure 1:
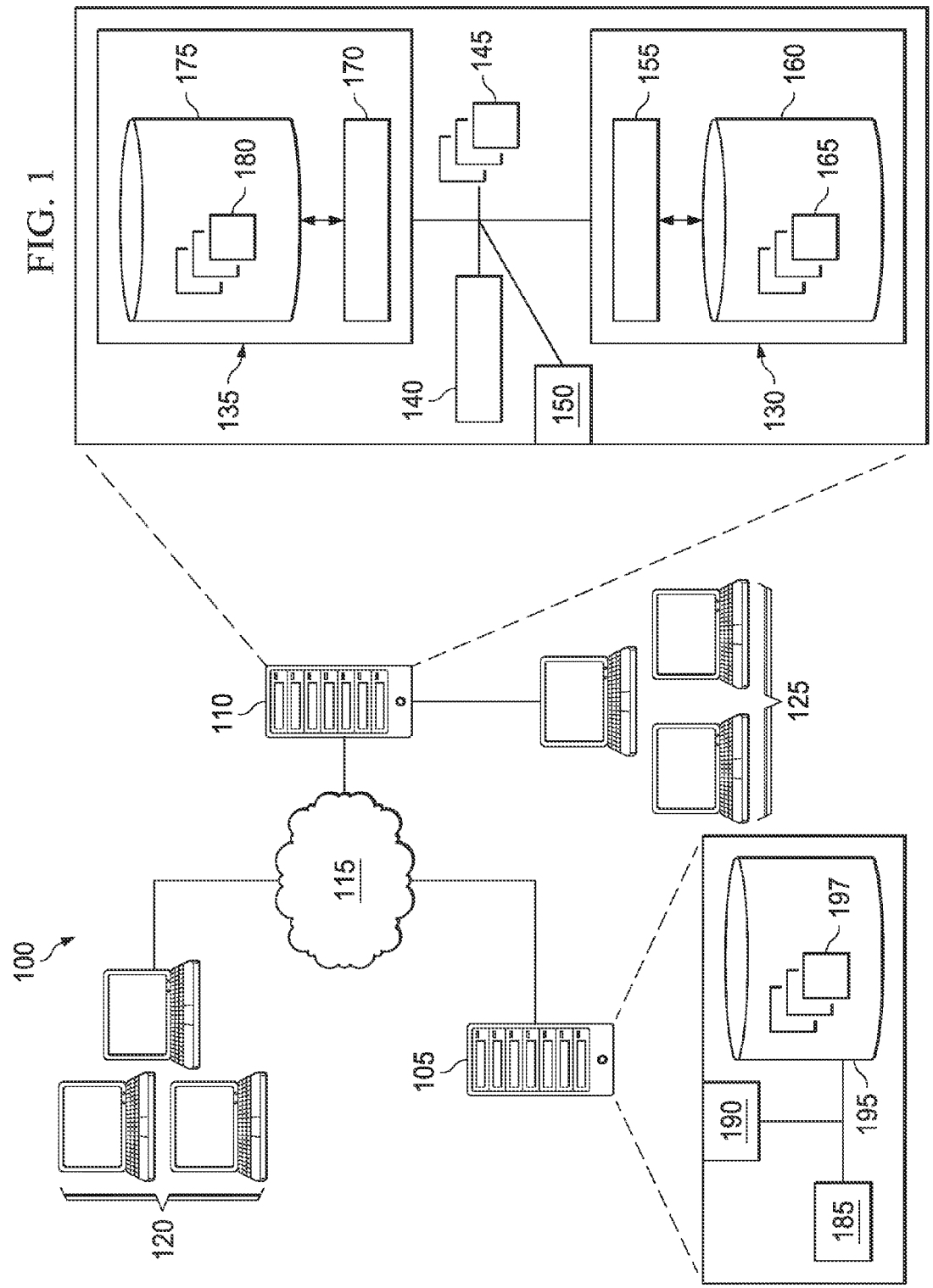
FIG. 1 illustrates an example distributed computing system including an application accelerator operable to optimize one or more software applications according to the present disclosure.

FIG. 1 illustrates an example distributed computing system 100 including an application accelerator 135 for optimizing a performance of one or more applications 145. As illustrated, the system 100 includes a host computing system 105, an enterprise computing system 110, and one or more clients 120 communicably coupled through a network 115. In alternative embodiments, however, one or more of these components may not be part of the distributed computing system 100 without departing from the scope of the present disclosure. For instance, in some embodiments, the host computing system 105 may not be included in the system 100, and logic (e.g., software, middleware, source code, executable instructions, data, and otherwise) illustrated as residing on the host computing system 105 may be located on, for example, the enterprise computing system 110 or another computing system communicably coupled through the network 115. In any event, the illustrated system 100 may have alternative embodiments where various components (e.g., servers, databases, software modules, and otherwise) are not present or reside in or on different appliances than shown in FIG. 1.

Each of the host computing system 105 and enterprise computing system 110 includes a server appliance having a processor and an interface. As illustrated host computing system 105 includes a processor (or processors) 185 and an interface (or interfaces) 190. The illustrated enterprise computing system 110 includes a processor (or processors) 140 and an interface (or interfaces) 150. As further illustrated, the enterprise computing system 110 includes the application accelerator 135. At a high level, the application accelerator 135 may selectively retrieve data stored in an in-memory database (e.g., electronic memory) rather than a main database (e.g., a non in-memory database) in response to a query by one or more users of the enterprise computing system 110 through one or more of the enterprise applications 145. In retrieving data from the in-memory database, the application accelerator 135 may improve performance of data retrieval and/or response to the query, thereby accelerating the performance of the one or more applications 145. More details regarding the operation of the application accelerator 135 are provided below and in the accompanying figures.

In general, the host computing system 105 and enterprise computing system 110 may each be one or more servers that store applications, software, middleware, and data, for example, the application accelerator 135, enterprise applications 145, and any hosted applications located on the host computing system 105. In some instances, the host computing system 105 and enterprise computing system 110 may each store a plurality of various applications. In some instances, the host computing system 105 and enterprise computing system 110 may each comprise a web server, where the application accelerator 135, the applications 145, and any other applications represent one or more web-based applications accessed and executed via network 115 by the clients 120 or enterprise clients 125, or other clients of the system 100 to perform the programmed tasks or operations of the application accelerator 135.

At a high level, the host computing system 105 and enterprise computing system 110 each represents an electronic computing device operable to receive, transmit, process, store, or manage data and information associated with the system 100. For example, the host computing system 105 and enterprise computing system 110 may each be responsible for receiving application requests from one or more client applications associated with the clients 120 of system 100 or enterprise clients 125 and responding to the received requests by processing said requests in the application accelerator 135, enterprise applications 145, and/or other application, and sending the appropriate response back to the requesting client application 120 or enterprise clients 125 illustrated in FIG. 1. Requests associated with the application accelerator 135 and/or other applications may also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server associated with the host computing system 105 and a single server associated with the enterprise computing system 110, system 100 can be implemented using two or more servers at each of the host computing system 105 and the enterprise computing system 110, as well as computers other than servers, including a server pool. Indeed, host computing system 105 and enterprise computing system 110 may each be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated host computing system 105 and enterprise computing system 110 may each be adapted to execute any operating system, including Linux, UNIX, Windows, Mac OS, or any other suitable operating system.

At a high level, the application accelerator 135 is any application, program, module, process, or other software that may execute, change, delete, generate, or otherwise manage information according to the present disclosure, particularly in response to and in connection with one or more requests received from the illustrated clients 120 and/or enterprise clients 125 and their associated client applications. In certain cases, system 100 may implement a composite application accelerator 135. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others.

Additionally, the application accelerator 135 may represent web-based applications accessed and executed by remote clients or client applications via the network 115 (e.g., through the Internet). Further, while illustrated as internal to the enterprise computing system 110, one or more processes associated with the application accelerator 135 may be stored, referenced, or executed remotely. For example, a portion of the application accelerator 135 may be a web service associated with the application that is remotely called, while another portion of the application accelerator 135 may be an interface object or agent bundled for processing at a remote client. Moreover, any or all of the application accelerator 135 may be a child or sub-module of another software module or enterprise application (not illustrated) without departing from the scope of this disclosure. Still further, portions of the application accelerator 135 may be executed by a user working directly at the enterprise computing system 110 (e.g., at clients 125), as well as remotely at clients 120.

Each illustrated interface (190, 150) may be used by the host computing system 105 and enterprise computing system 110, respectively, for communicating with other systems in a client-server or other distributed environment (including within system 100) connected to the network 115 (e.g., clients 120 and/or 125, as well as other systems communicably coupled to the network 115). Generally, each interface (190, 150) includes logic encoded in software and/or hardware in a suitable combination and operable to communicate with the network 115. More specifically, each interface (190, 150) may comprise software supporting one or more communication protocols associated with communications such that the network 115 or interface's hardware is operable to communicate physical signals within and outside of the illustrated system 100.

As illustrated in FIG. 1, the host computing system 105 and the enterprise computing system 110 each includes a processor (185, 140). Although illustrated as a single processor (185, 140) in FIG. 1, two or more processors may be used according to particular needs, desires, or particular embodiments of system 100. Each processor (185, 140) may be a central processing unit (CPU), a blade, an application specific integrated circuit (ASIC), a field-programmable gate array (FPGA), or another suitable component. Generally, the processor (185, 140) executes instructions and manipulates data to perform the operations of the respective host computing system 105 or enterprise computing system 110 and, specifically, the application accelerator 135, applications 145, and other applications. Specifically, the processor (185, 140) executes the functionality required to receive and respond to requests from the clients 120 and/or 125 and their respective client applications, as well as the functionality required to perform the other operations of the application accelerator 135.

Regardless of the particular implementation, "software" may include computer-readable instructions, firmware, wired or programmed hardware, or any combination thereof on a tangible, non-transitory (or in some instance transitory) medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated system 100, processor (185, 140) executes the respective portion (all are a part) of the applications on the enterprise computing system 110 (as well as applications on the host computing system 105).

Generally, the network 115 facilitates wireless or wireline communications between the components of the system 100 (i.e., between the host computing system 105 and enterprise computing system 110 and the clients 120 and/or 125), as well as with any other local or remote computer, such as additional clients, servers, or other devices communicably coupled to network 115 but not illustrated in FIG. 1. The network 115 is illustrated as a single network in FIG. 1, but may be a continuous or discontinuous network without departing from the scope of this disclosure, so long as at least a portion of the network 115 may facilitate communications between senders and recipients. The network 115 may be all or a portion of an enterprise or secured network, while in another instance at least a portion of the network 115 may represent a connection to the Internet. In some instances, a portion of the network 115 may be a virtual private network (VPN), such as, for example, the connection between the clients 120 and/or 125 and the host computing system 105 and the enterprise computing system 110. Further, all or a portion of the network 115 can comprise either a wireline or wireless link. Example wireless links may include 802.11a/b/g/n, 802.20, WiMax, and/or any other appropriate wireless link. In other words, the network 115 encompasses any internal or external network, networks, sub-network, or combination thereof operable to facilitate communications between various computing components inside and outside the illustrated system 100.

The network 115 may communicate, for example, Internet Protocol (IP) packets, Frame Relay frames, Asynchronous Transfer Mode (ATM) cells, voice, video, data, and other suitable information between network addresses. The network 115 may also include one or more local area networks (LANs), radio access networks (RANs), metropolitan area networks (MANs), wide area networks (WANs), all or a portion of the Internet, and/or any other communication system or systems at one or more locations.

As illustrated, the enterprise computing system 110 includes an ERP system 130 and the application accelerator 135. The ERP system 130 includes one or more application servers 155 communicably coupled to a main database 160. The main database 160 stores one or more (and typically hundreds or thousands) database tables 165 storing data used, referenced, queried, or otherwise called by the enterprise applications 145. For example, in a typical process, a user of a particular enterprise application 145 may initiate a query for data stored in the database tables 165 of the main database 160. The particular application 145 may retrieve the queried data through the application server 155 and return the queried data to be displayed to the user (e.g., through a graphical user interface (GUI) on one of the enterprise clients 125). In some instances, retrieval of data stored in the database tables 165 on the main database 160, as well as retrieval of data stored in the database tables 180 on the in-memory database 175, may be in real-time. Data in the database tables 165 on the main database 160, however, may be more current due to, for instance, replication time that may be necessary to replicate data from the main database 160 to the in-memory database 175. Thus, changes made to data on the main database 160 may be seen in the in-memory database 175 in near real-time (e.g., in between 0.5 to 6 seconds). Retrieval of data from the in-memory database 175 may be faster than retrieval of data from the main database 160 (e.g., due to differences in the in-memory database 175 and main database 160). In a specific example, retrieval of data stored in the database tables 165 on the main database 160 (e.g., a query return time) may be approximately 30 seconds while retrieval of data stored in the database tables 180 on the in-memory database 175 may be approximately 1 second. However, the data retrieved from the database tables 180 in the in-memory database 175 may have a delay of approximately 5 seconds in a situation where the query includes data that is being continuously replicated from the main database 160 to the in-memory database 175. The data retrieved from the database tables 180 in the in-memory database 175 may have approximately no delay in a situation where the query includes data that was previously (e.g., in the last hour, day, week, etc.) replicated from the main database 160 to the in-memory database 175.

The illustrated main database 160 is a magnetic storage medium storing the database tables 165 in a relational database management system. For example, the main database 160 may be a secondary or tertiary storage, such as one or more hard disk drives, optical disc drives, and other devices that are non-volatile. Access to the data in the database tables 165 may be constrained by the speed at which the main database 160 may be accessed by the applications 145 through the application server 155.

The illustrated application accelerator 135 is stored on the same or a different server appliance in the enterprise computing system 110 as compared to the ERP system 130. In any event, the application accelerator 135 is communicably coupled so that one or more of the database tables 165 may be replicated to an in-memory database 175 as database tables 180. Thus, in some embodiments, the database tables 180 may be a subset of the database tables 165 stored in the main database 160. For example, the database tables 180 may include transparent database tables, and database views in case all base tables are replicated from the main database 160 to the in-memory database 175.

The application accelerator 135 include an instrumented application server 170 and the in-memory database 175. The instrumented application server 170 may be similar to the application server 155 on the ERP system 130 in that the instrumented application server 170 may execute the enterprise applications 145 without modifications to such applications 145. The illustrated in-memory database 175 includes volatile electronic memory (e.g., RAM) in which data from the database tables 180 may be retrieved. In some embodiments, the illustrated in-memory database 175 may include integrated processing, i.e., all business and/or analytic operations done in processing memory. Moreover, content from business content sources may be replicated from one or more transactional systems (e.g., coupled to the network 115) to the in-memory database 175 immediately. Thus, the in-memory database 175, in some aspects, may handle the analytical systems for all business data in real-time, as opposed to, for instance, computational processing systems that have separate transactional and analytical systems that connect through relational databases (i.e., relational databases stored on magnetic memory that require a process, e.g., ETL, to transfer data from one system to another not in real time but with a delay of an hour, day, week, or longer).

In some embodiments, the in-memory database 175 may expose business data and capabilities to improve an end-solution for end users (e.g., the clients 125). The in-memory database 175 may reside on top of a computational engine (e.g., in the application accelerator 135 or otherwise) that facilitates fast manipulations on large amounts of business data and/or replication of entire business application information. Thus, in some embodiments, the in-memory database may provide for the following design principles/concepts: business data in real-time or near real-time (e.g., GUI patterns for constantly updated business data); well modeled tables and data cubes (e.g., in order to provide semantic services); a highly parallelized computational engine (e.g., for computationally intensive GUI patterns such as real time alerts and/or suggestions); close coupling of business logic and business data (e.g., eliminating indexing and caching).

The host computing system 105 also includes a memory 195 that stores one or more scenarios 197. Memory 195 may include any memory or database module and may take the form of volatile or non-volatile memory including, without limitation, magnetic media, optical media, random access memory (RAM), read-only memory (ROM), removable media, or any other suitable local or remote memory component. Memory 195 may store, along with the scenarios 197, various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the host computing system 105.

In some embodiments, the scenarios 197 may define one or more situations (e.g., contexts) in which the application accelerator 135 may retrieve data from one or more of the database tables 180 stored in the in-memory database 175 rather than the database tables 165 stored in the main database 160. In some embodiments, the scenarios 197 may be defined in one or more configuration tables (shown in more detail in FIGS. 3A-3C) with one or more parameters, such as, for example, database table names, enterprise application names, job names, or other parameters (as explained more fully below).

Each of the illustrated clients 120 and/or 125 may be any computing device operable to connect to or communicate with at least the host computing system 105 and enterprise computing system 110 and/or via the network 115 using a wireline or wireless connection. Further, each illustrated client typically includes a processor, an interface, a graphical user interface (GUI), a client application, and a memory. In general, each illustrated client comprises an electronic computer device operable to receive, transmit, process, and store any appropriate data associated with the system 100 of FIG. 1.

There may be any number of clients associated with, or external to, system 100. For example, while illustrated system 100 includes two sets of clients (120 and 125), alternative implementations of system 100 may include a single client communicably coupled to the host computing system 105 and enterprise computing system 110, or any other number suitable to the purposes of the system 100. Additionally, there may also be one or more additional clients external to the illustrated portion of system 100 that are capable of interacting with the system 100 via the network 115. Further, the term "client" and "user" may be used interchangeably as appropriate without departing from the scope of this disclosure. Moreover, while each client is described in terms of being used by a single user, this disclosure contemplates that many users may use one computer, or that one user may use multiple computers.

As used in this disclosure, "client" is intended to encompass a personal computer, touch screen terminal, workstation, network computer, kiosk, wireless data port, smart phone, personal data assistant (PDA), one or more processors within these or other devices, or any other suitable processing device. For example, each client may comprise a computer that includes an input device, such as a keypad, touch screen, mouse, or other device that can accept user information, and an output device that conveys information associated with the operation of the host computing system 105 and the enterprise computing system 110 (and application accelerator 135) or the client itself, including digital data, visual information, the client application, or the GUI.

Both the input and output device may include fixed or removable storage media such as a magnetic storage media, CD-ROM, or other suitable media to both receive input from and provide output to users of the clients through the display, namely, the GUI.

A GUI typically comprises a graphical user interface operable to interface with at least a portion of system 100 for any suitable purpose, including generating a visual representation of client application (in some instances, the client's web browser) and the interactions with the application accelerator 135, including the responses received from the application accelerator 135 received in response to the requests sent by a client application. Generally, through the GUI, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, a GUI can represent any graphical user interface, including but not limited to, a web browser, touch screen, or command line interface (CLI) that processes information in system 100 and efficiently presents the information results to the user.

In general, a GUI may include a plurality of user interface (UI) elements, some or all associated with a client application or the application accelerator 135, such as interactive fields, pull-down lists, and buttons operable by the user at a particular client. These and other UI elements may be related to or represent the functions of the client application, as well as other software applications executable from a particular illustrated client. For purposes of the present location, a GUI may be a part of or the entirety of a client application, while also merely a tool for displaying the visual representation of application actions and interactions.

Figure 2:
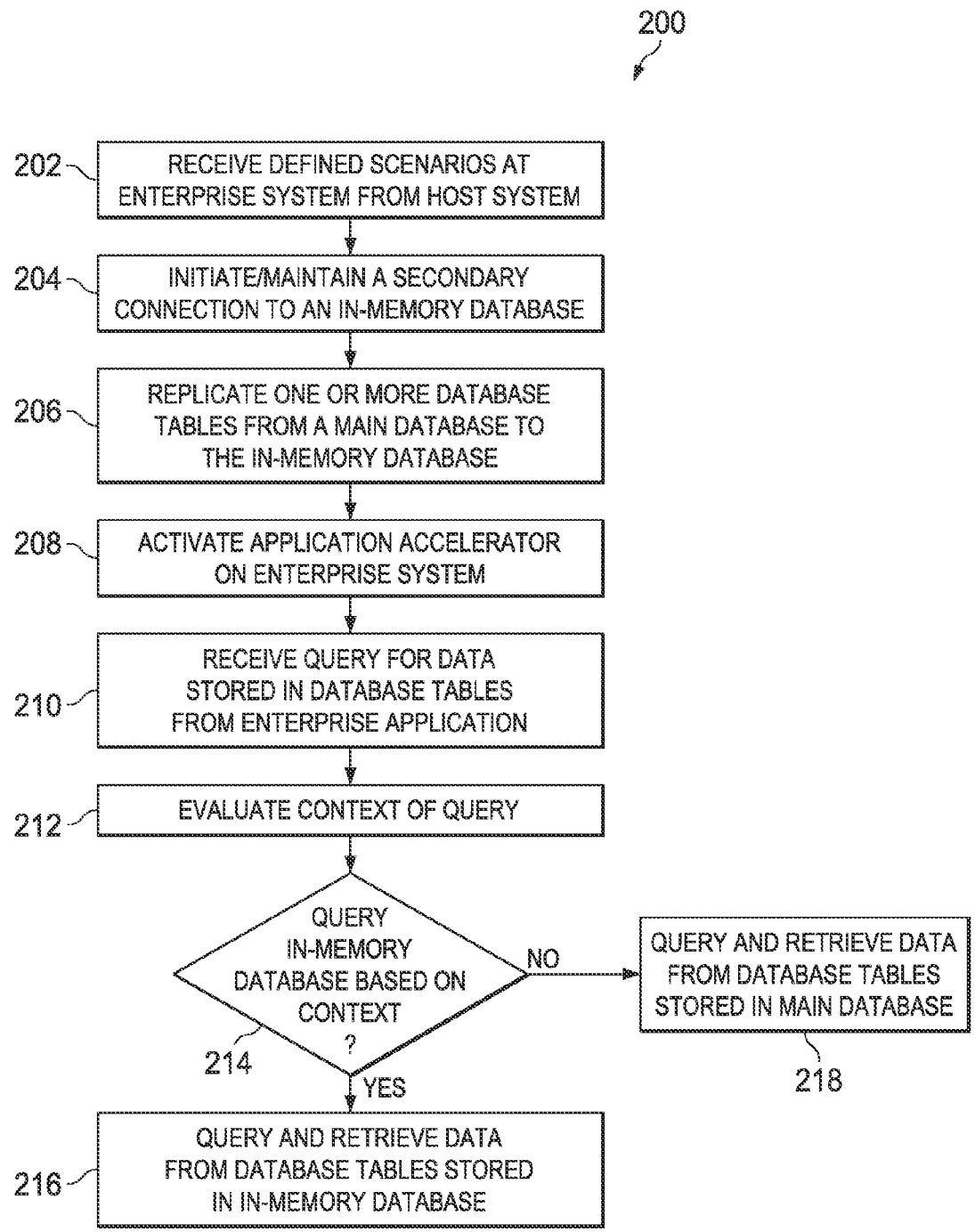
FIG. 2 illustrates an example method for optimizing one or more software applications according to the present disclosure.

FIG. 2 illustrates an example method 200 for optimizing one or more software applications through an application accelerator, such as the application accelerator 135 illustrated in the distributed computing system 100. In some embodiments, method 200 may be performed with one or more of the components of the distributed computing system 100. Method 200 may begin at step 202, when an enterprise computing system (e.g., enterprise computing system 110) receives one or more defined scenarios from a host computing system (e.g., host computing system 105). The scenarios, in some embodiments, may include one or more of the scenarios 197 stored in the memory 195 of the host computing system 105 and may be defined by one or more configuration tables.

For example, turning briefly to FIG. 3A, a configuration table 300 is illustrated that may, at least in part, help define a scenario by defining the context in which data is to be read from the in-memory database by the application accelerator. The illustrated configuration table 300 holds application specific context data defining at least one scenario. In some embodiments, the configuration table 300 may be a transparent table. As illustrated, configuration table 300 defines a scenario 305, a table name 310, a program name 315, and a job name 320 (e.g., a background job name).

The scenario 305 is a field that is introduced to allow the definition of overlapping scenarios that can be maintained independently. It contains the identification of a scenario in which data may be retrieved from database tables in the in-memory database rather than the main database. As further illustrated, the configuration table 300 defines a data element RDA-SCENARIO, a data type of "character," a length of 20 characters, and a description of the field that describes the scenario 305.

The table name 310 contains the name of a table or view that should be read from the in-memory database in the particular scenario 305. As illustrated, the configuration table 300 defines a data element TABNAME, a data type of "character," a length of 30 characters, and a description of the field that describes the table name 310.

The program name 315 defines the main program (i.e., the calling program, or enterprise application), which, at least in part, sets the context in which data should be read from the in-memory database in the particular scenario 305. As illustrated, the configuration table 300 defines a data element PROGNAME, a data type of "character," a length of 40 characters, and a description of the field that describes the program name 315.

The job name 320 defines the name of a job in the particular scenario 305. For example, the job name 320 can be specified in a particular scenario 305 to ensure that a secondary database is used when the program, or application, is running in the background. The background job is thus identified by the job name 320. As illustrated, the configuration table 300 defines a data element BTCJOB, a data type of "character," a length of 32 characters, and a description of the field that describes the job name 320.

The context of the scenarios (e.g., a collection of contexts), in some embodiments, may also be defined by a configuration table 300 illustrated in FIG. 3A. Turning to FIG. 3B, the configuration table 330 may be used to specify if a scenario 305 is switched on or off (e.g., activate or deactivate a particular scenario). The illustrated configuration table 330 also holds the logical name of a secondary connection 345 per scenario (e.g., a connection between an instrumented application server of the application accelerator and the in-memory database); a version number 335 of the scenario 305; and a date 355, a time 360, and a user 350 of the last change to the scenario 305. In addition, the configuration table 330 may include a description 365 for a scenario 305.

As illustrated, the configuration table 330 defines a data element RDA_VERSION, a data type of "number," a length of 10 digits, and a description of the scenario version 335.

As illustrated, the configuration table 330 defines a data element RDA_STATUS, a data type of "character," a length of 1 character, and a description of the field that describes the scenario status 340. In some embodiments, the scenario status 340 may indicate if the particular scenario 305 is turned "off" (e.g., does not allow for retrieval of data in database tables in the in-memory database) or "on" (e.g., does allow for retrieval of data in database tables in the in-memory database). For example, if scenario 305 is turned "on," then the scenario status 340 is set to "A" while the status 340 is set to "1" if it is turned "off."

As illustrated, the configuration table 330 defines a data element DBCON_NAME, a data type of "character," a length of 30 characters, and a description of the field that describes the secondary connection 345.

As illustrated, the configuration table 330 defines a data element SYUNAME, a data type of "character," a length of 12 characters, and a description of the field that describes the user 350, which made a last change to the scenario 305.

As illustrated, the configuration table 330 defines a data element SYDATUM, a data type of "date," a length of 8 characters (e.g., MMDDYYYY), and a description of the field that describes the date 355, on which the last change to the scenario 305 was made.

As illustrated, the configuration table 330 defines a data element SYUZEIT, a data type of "time," a length of 6 characters (e.g., HHMMSS), and a description of the field that describes the time 360 at which the last change to the scenario 305 was made.

As illustrated, the configuration table 330 defines a data element CHAR200, a data type of "character," a length of 200 characters, and a description 365 of the scenario 305.

The scenarios, in some embodiments, may also be defined by a configuration table 370 illustrated in FIG. 3C. In some embodiments, configuration table 370 may be generated by joining portions of the configuration tables 300 and 330 based on one or more conditions being met. For example, configuration tables 300 and 330 may be joined to form configuration table 370 when a value of the scenario 305 field is the same in both tables 300 and 330. In some instances, an additional condition must be met in that the scenario status 340 in the configuration table 330 must be set to "on" (e.g., set to "A"). As illustrated, configuration table 370 defines the table name 310, the program name 315, the job name 320, the secondary connection 345, and the scenario 305.

Turning briefly to FIG. 4, another example view of a configuration table 400 is illustrated. Configuration table 400 may be another example view of a table that joins two configuration tables, such as configuration tables 300 and 330. Configuration table 400, as illustrated, includes columns for a table name 405, a program name 410, a job name 415, a secondary connection 420, and a scenario 425. Configuration table 400 stores, in its rows, the table name 405, the program name 410, the job name 415, the secondary connection 420, and the scenario 425, in accordance with the parameters described above (e.g., data type and length parameters).

In step 202, the enterprise computing system may receive one or more of the configuration tables 300, 330, and 370 defining the scenarios in which the application accelerator may facilitate a query and retrieval of data from database tables stored in the in-memory database rather than the main database. In some instances, the configuration tables 300, 330, and/or 370 may update and/or maintain a previously transmitted scenario. For example, tables 300, 330, and 370 may be delivered on a per scenario basis from the host computing system as updates or upgrades (e.g., as attachments) to the application accelerator.

In some embodiments, the scenarios can be defined as files in an attached XML file. Further, in some embodiments, a dedicated program may process the XML file format and upload the scenarios from the XML file. The dedicated program may, for example, facilitate upload of scenario data, storing them in the configuration tables 300 and 330 previously delivered to the enterprise computing system. The dedicated program may facilitate the actions of, for instance: activation, deactivation, or deletion of scenarios; replacement of a scenario with a new scenario version; switch scenarios on or off and enter the secondary database connection per scenario; creation of transport requests for all changes on the configuration table 300; and execution of several checks. The checks may include, for example, a check of the existence of database tables and views in the in-memory database, a check of consistency for the entries per scenario to ensure no logical duplicates of database tables in the in-memory database, a check that any particular database table that appears in several scenarios with different connections has different context, and a check that a particular secondary database connection exists and is of a correct type.

In some embodiments, in step 202 (or at another point in method 200), a flag is set in a runtime object that will indicate to the application accelerator that a particular database table may participate in a particular scenario (e.g., that the database table is present in the in-memory database). In such embodiments, the flag may help keep any performance impact as low as possible by ensuring that there is minimal performance impact on database tables that do not participate in any scenario. For example, in the case of buffered database tables buffered on application server 155, an impact on query performance could be significant (e.g., about 100% increase) if every query utilized the configuration tables 300, 330, and/or 370.

In step 204, a secondary connection is initiated or maintained from the instrumented application server of the application accelerator to the in-memory database. A primary connection between the instrumented application server of the application accelerator and the main database may already exist in step 204, or may also be initiated. For example, in some instances, the secondary connection may presently exist and may merely be confirmed as operable in step 204.

In step 206, one or more database tables may be replicated from the main database to the in-memory database. In some embodiments, such replication may be substantially continuous upon installation of the application accelerator in the enterprise computing system. Thus, although step 206 describes replication of database tables from the main database to the in-memory database, such replication may also occur before, during, and after step 206. In some embodiments, the secondary connection may be initiated and replication may be accomplished with a single tool, such as, for example, a real-time replication tool that can create tables and views in the in-memory database and start the replication of data from the main database to the in-memory database. In some embodiments, for instance, the application accelerator may be agnostic to replication (e.g., assumes that the replication is running and does not check this). Replication, in some embodiments, can be triggered manually or, alternatively, automatically.

In step 208 of the method 200, the application accelerator on the enterprise computing system is activated. For example, in some embodiments, the application accelerator may be activated (e.g., set to "on") by a particular status field in a configuration table, such as the status 340 in the configuration table 330. With this status field, for example, it is possible to activate the application accelerator on a per application basis.

Some consideration may be given in determining whether to activate the application accelerator. For instance, data replicated from the main database to the in-memory database may not be as complete as the data stored in the main database, since replication may take some period of time. Further, replication may not guaranty consistency of transfer of data from the main database to the in-memory database. In some embodiments, changes made to the data (e.g., by one of the applications 145) in the main database may not be realized in the in-memory database until a later replication.

In step 210, a query is received at the application accelerator (e.g., from one of the clients 125) for data stored in the enterprise computing system. The query is evaluated for context in step 212. For example, during runtime, the context of every query may include, for example, a table name <tabname>, a program name <sy_cprog>, and a job name <jobname>. This context is compared with the entries in the configuration table 370. If the context is given as table name, program name, and job name, a determination as to which database (i.e., the main database or the in-memory database) the queried data is retrieved from is evaluated as follows. First, if the configuration table 370 contains an entry for the table name (e.g., table name 310) that matches the table name context of the query, but contains no entries for program name (e.g., program name 315) and job name (e.g., job name 320), then data is retrieved through the specified secondary connection (e.g., DBCONNECTION) from the specified database table stored in the in-memory database. Second, if the configuration table 370 contains an entry for the table name (e.g., table name 310) that matches the table name context of the query and an entry for program name (e.g., program name 315) that matches the program name context of the query, but contains no entry for job name (e.g., job name 320), then data is retrieved through the specified secondary connection (e.g., DBCONNECTION) from the specified database table stored in the in-memory database. Third, if the configuration table 370 contains an entry for the table name (e.g., table name 310) that matches the table name context of the query, an entry for program name (e.g., program name 315) that matches the program name context of the query, and an entry for job name (e.g., job name 320) that matches the job name context of the query, then data is retrieved through the specified secondary connection (e.g., DBCONNECTION) from the specified database table stored in the in-memory database. If none of these conditions are met, then the data is retrieved through the primary connection (e.g., a default connection) with the main database. An example pseudo-code is provided below that describes the context evaluation of step 212.

```
select secondary connection 345 from table 370 into
dbconnection up to 1 rows
    where table name 310 = tabname
        and (program name 315 = ' ' and job name 320 = ' '
        or (program name 315 = sy-cprog
            and (job name 320 = ' ' or job name 320 =
jobname))).
    exit.
endselect.
if sy-subrc <> 0.
    dbconnection = 'DEFAULT'.
endif.
```

In step 214, if the determination is made that data from database tables stored in the in-memory database should be retrieved in response to the query according to step 212, then the queried data is retrieved from the specified database table stored in the in-memory database through the specified secondary connection in step 216. If the determination is made that data from database tables stored in the main database should be retrieved in response to the query according to step 212, then the queried data is retrieved from the specified database table stored in the main database through the default connection in step 218.

A number of implementations have been described. Nevertheless, it will be understood that various modifications can be made. For example, other methods described herein besides those, or in addition to those, illustrated in FIG. 2 can be performed. Further, the illustrated steps of method 200 can be performed in different orders, either concurrently or serially. Further, steps can be performed in addition to those illustrated in method 200, and some steps illustrated in method 200 can be omitted without deviating from the present disclosure. As another example, in some embodiments, parameters in addition to, for example, table name, main program and job name, may be used to specify a context of a scenario. For example, transaction name, user name, module name (such as function, method or subroutine), and other parameters may be used in addition to or in place of the parameters of table name, main program and job name to specify a context. As another example, different parameters may be specified as patterns using wildcards. Further, in some embodiments, for WHERE conditions of database queries, patterns may be used as additional parameters for a context definition. For example, if a query has a field "COUNTRY" which specifies a particular country location, the query would be redirected to an in-memory database only if the condition "COUNTRY=MyCountry" is met. Such a feature may be combined with the possibility to replicate only subsets of data to the in-memory database. As another example, in some embodiments, redirection of a query to an in-memory database as opposed to a main database may be performed (e.g., transparently) even in cases in which the redirection makes for a slower query response. For instance, redirection could be used, for example, to apply changes (e.g., maintenance, updates, etc.) to the main database without disrupting the service for the database clients. Accordingly, other implementations are within the scope of the following claims.

What is claimed is:

1. A method performed with a computing system for optimizing a performance of an enterprise application, the method comprising:

receiving, at the local computing system that comprises an enterprise computing system, from a remote computing system that executes a hosted application, one or more configuration tables defining a predefined query scenario for querying and retrieving data from the hosted application for data stored on a database table;

replicating a database table from a main database to a secondary database, the main database comprising updated data relative to data contained in the database table of the secondary database, the secondary database comprising an in-memory database and the main database comprising a magnetic memory;

receiving, at the local computing system, a query from the enterprise application for data stored on the database table, the query comprising a query return time and a context;

comparing the context of the query to a context of the predefined query scenario, the context of the query comprising at least one of a database table name, a scenario application name, or a scenario job name;

based on the context of the query matching the context of the predefined query scenario, retrieving data stored on the secondary database replicated from data stored on the main database; and passing the retrieved data from the secondary database to the enterprise application.

2. The method of claim 1, wherein the predefined query scenario comprises a scenario table name, and comparing the context of the query to a context of a predefined query scenario comprises comparing the name of the database table to the scenario table name.

3. The method of claim 1, wherein the predefined query scenario further comprises a scenario application name, and comparing the context of the query to a context of a predefined query scenario further comprises:
comparing a name of the application to the scenario application name.

4. The method of claim 1, wherein the predefined query scenario further comprises a scenario job name, and comparing the context of the query to a context of a predefined query scenario further comprises:
comparing a name of a background job to the scenario job name.

5. The method of claim 1, further comprising:
receiving, at the local computing system, a second query from the application for data stored on a database table, the second query comprising a second context defined by a name of the database table;
comparing the second context of the query to the context of the predefined query scenario;
based on the second context of the second query not matching the context of the predefined query scenario, retrieving the data from the main database; and
passing the retrieved data from the main database to the application.

6. The method of claim 5, wherein the data is retrieved, in response to the second query, from the main database through a primary connection, and the data is retrieved, in response to the query, from the secondary database through a secondary connection.

7. A non-transitory computer storage medium encoded with a computer program, the program comprising instructions that when executed by one or more computers cause the one or more computers to perform operations comprising:
receiving, at the local computing system that comprises an enterprise computing system from a remote computing system that executes a hosted application, one or more configuration tables defining a predefined query scenario for querying and retrieving data from the hosted application for data stored on a database table;
replicating a database table from a main database to a secondary database, the main database comprising updated data relative to data contained in the database table of the secondary database, the secondary database comprising an in-memory and the main database comprising a magnetic memory;
receiving, at the local computing system, a query from the enterprise application for data stored on the database table, the query comprising a query return time and a context;
comparing the context of the query to a context of the predefined query scenario, the context of the query comprising at least one of a database table name, a scenario application name or a scenario job name;
based on the context of the query matching the context of the predefined query scenario, retrieving data stored on the secondary database replicated from data stored on the main database; and
passing the retrieved data from the secondary database to the enterprise application.

8. The computer storage medium of claim 7, wherein the operations further comprise:
receiving, at the local computing system, the predefined query scenario from a remote computing system.

9. The computer storage medium of claim 7, wherein the predefined query scenario comprises a scenario table name, and comparing the context of the query to a context of a predefined query scenario comprises comparing the name of the database table to the scenario table name.

10. The computer storage medium of claim 7, wherein the predefined query scenario further comprises a scenario application name, and comparing the context of the query to a context of a predefined query scenario further comprises:
comparing a name of the application to the scenario application name.

11. The computer storage medium of claim 7, wherein the predefined query scenario further comprises a scenario job name, and comparing the context of the query to a context of a predefined query scenario further comprises:
comparing a name of a background job to the scenario job name.

12. The computer storage medium of any claim 7, wherein the secondary database comprises an in-memory database that comprises volatile RAM memory, and the main database comprises magnetic memory.

13. The computer storage medium of claim 7, wherein the operations further comprise:
receiving a second query from the application for data stored on a database table, the second query comprising a second context defined by a name of the database table;
comparing the second context of the query to the context of the predefined query scenario;
based on the second context of the second query not matching the context of the predefined query scenario, retrieving the data from the main database; and
passing the retrieved data from the main database to the application.

14. The computer storage medium of claim 13, wherein the data is retrieved, in response to the second query, from the main database through a primary connection, and the data is retrieved, in response to the query, from the secondary database through a secondary connection.

15. A system of one or more computers configured to perform operations comprising:
receiving, at the local computing system that comprises an enterprise computing system from a remote computing system that executes a hosted application, one or more configuration tables defining a predefined query scenario for querying and retrieving data from the hosted application for data stored on a database table;
replicating a database table from a main database to a secondary database, the main database comprising updated data relative to data contained in the database table of the secondary database, the secondary database comprising an in-memory database and the main database comprising a magnetic memory;
receiving, at the local computing system, a query from the enterprise application for data stored on the database table, the query comprising a query return time and a context;
comparing the context of the query to a context of the predefined query scenario, the context of the query comprising at least one of a database table name, a scenario application name or a scenario job name;
based on the context of the query matching the context of the predefined query scenario, retrieving data stored on the secondary database replicated from data stored on the main database; and passing the retrieved data from the secondary database to the enterprise application.

16. The system of claim 15, wherein the operations further comprise:
receiving, at the local computing system, the predefined query scenario from a remote computing system.

17. The system of claim 15, wherein the predefined query scenario comprises a scenario table name, and comparing the context of the query to a context of a predefined query scenario comprises comparing the name of the database table to the scenario table name.

18. The system of claim 15, wherein the predefined query scenario further comprises a scenario application name, and comparing the context of the query to a context of a predefined query scenario further comprises:
comparing a name of the application to the scenario application name.

19. The system of claim 15, wherein the predefined query scenario further comprises a scenario job name, and comparing the context of the query to a context of a predefined query scenario further comprises:
comparing a name of a background job to the scenario job name.

20. The system of claim 15, wherein the secondary database comprises an in-memory database that comprises volatile RAM memory, and the main database comprises magnetic memory.

21. The system of claim 15, wherein the operations further comprise:
receiving a second query from the application for data stored on a database table, the second query comprising a second context defined by a name of the database table;
comparing the second context of the query to the context of the predefined query scenario;
based on the second context of the second query not matching the context of the predefined query scenario, retrieving the data from the main database; and
passing the retrieved data from the main database to the application.

22. The system of claim 21, wherein the data is retrieved, in response to the second query, from the main database through a primary connection, and the data is retrieved, in response to the query, from the secondary database through a secondary connection.

* * * * *